United States Patent Office 3,160,958
Patented Dec. 15, 1964

3,160,958
MEASURING AND RECORDING ARRANGEMENTS
Keith Gordon Huntley, Hillbrook, The Uplands, England, assignor to Rank Precision Industries Limited, London, England, a British company
Filed Nov. 21, 1960, Ser. No. 70,842
Claims priority, application Great Britain, Nov. 25, 1959, 40,109
8 Claims. (Cl. 33—174)

This invention relates to instruments for measuring and recording dimensional parameters of physical objects, in particular of the kind producing a record, whether permanent or transient, of the out-of-roundness of a workpiece.

Arrangements have been proposed for measuring the roundness of a workpiece and generating a graphical record of the successive readings in the form of a continuous trace displayed against limit markers such as limit circles. In a known instrument, a sensing member mounted upon a rotating spindle is made to feel a contour of a stationary workpiece under test. The distance of each point on the contour from a datum which is constant for the entire periphery of the object is converted through the sensing member and associated devices into an analogue signal. This signal, suitably amplified, is translated into the continuous trace referred to above by means including a recorder in which a pen is rotated in synchronism with the sensing member and bears upon a stationary chart.

In the above instrument, and indeed in any arrangement in which the contour of a workpiece is sensed by a sensing member in rotational relationship therewith for the purpose of dipslaying the contour trace upon a recording chart, eccentricity between the true centre of the stationary part and the true centre of the rotating part must be substantially eliminated if the contour trace is to be drawn at least approximately concentric with the chart centre which is desirable for the correct reading of the trace and proper utilization of the useful chart area. This calls for laborious and tedious setting up which adversely affects operational rate where a batch of workpieces are to be tested in quick succession particularly in the higher ranges of error signal magnification.

One object of the present invention is to eliminate the need for accurate setting up of the workpiece and to enable a contour trace to be displayed correctly centred on a display device such as a chart.

A correctly centred contour trace greatly simplifies the evaluation of the contour traces in any section of the trace but offers no definite indication of the mean value of said contour trace which can only be estimated with an approximation largely depending on the skill of the operator, assuming that said mean value is in fact required.

It is a further object of the present invention to provide means whereby a mean curve representing the mean value of the contour trace may be automatically superposed upon said trace.

The invention consists of a system comprising sensing means adapted to be placed in approximate concentric rotational relationship with an object for the purpose of feeling a given contour of said object, means deriving from said sensing means a total electrical signal which is representative of the distance of each point on the periphery from a datum which is constant for the entire periphery of the object, said signal including a true contour component and an error component proportional to such mounting eccentricity as may be incurred in establishing the said rotational relationship as between object and sensing means, recorder means comprising chart and signal responsive recorder elements mountable for relative rotation about a recorder axis, means including motor means responsive to said signal for effecting a preliminary relative adjustment as between the center of said chart and said recorder axis in response to said error component in said signal to compensate for said mounting eccentricity, and means for then applying said signal to said recorder element of said recorder means for recording on said chart only the true contour component of said signal concentric with the center of said chart.

The invention also includes means for integrating and storing the mean value of the contour signal and means for also recording on the chart the mean value of the signal and with the chart center aligned with the recorder axis.

It may be easily shown that the eccentricity referred to is represented to a first order of approximation by the fundamental component of the signal (i.e. the fourier component the frequency of which corresponds to the rotation frequency in said rotational relationship).

In accordance with one aspect of the invention, said component is evaluated and caused to produce an adjustment which counteracts the offsetting, otherwise caused by eccentricity, of the centre of the contour trace relative to the centre of the chart.

The evaluation of said component is preferably completed at the end of a first complete revolution in said rotational relationship, the contour trace being produced in a subsequent revolution.

Either during the first or a subsequent complete revolution, the mean value of the error signal may be evaluated by a process of integration and the final value stored.

A mean trace, usually in the form of a mean circle, may be produced from the stored value in a further revolution, the mean trace indicating, in effect, mean radius relatively to the contour trace, the two traces being both correctly centred on the centre of the chart regardless of any residual eccentricity in the rotational relationship.

The traces may be displayed by means of a mechanical arrangement including a pen recorder and a disc chart either of which parts is synchronously rotatable with a spindle carrying the sensing means while the other part is stationary.

Where the chart is rotatable, said fundamental component is caused to adjust the position of the recorder relatively to the centre of the chart with which it cooperates. If the recorder is rotatable, the adjustment is applied to the table bearing the chart. In either case, a servo-motor arrangement with tachometer feed-back is preferably employed.

For certain applications it may be more convenient to replace the mechanical pen recorder of the type for instance described in British patent specification No. 706,763 with a non-mechanical recorder. The latter may take the form of a cathode ray tube provided with the necessary means for supplying it with the deflection and other control signals required for causing the beam, or a beam thereof, to define a visible trace upon the screen in response to the detected contour error and a superposed trace representing the mean of the error in a manner which ensures that both traces are correctly centred on the centre of the screen, which in this case represents the chart.

A separate beam may be employed for producing each trace.

The cathode ray tube display may be used for visual check purposes or for deriving a permanent record therefrom by any suitable recording process such as by photography or by electron-photography.

The device of the present invention lends itself to a rapid check and evaluation of one contour against any other in the workpiece under test. This may be accomplished for instance by the successive steps of automatically centering the chart, producing a recording of one contour, locking the automatic centering mechanism, shifting the workpiece to a new position for sensing a second contour, and producing a recording of said second contour. If the two contours traced are in the space relationship which is desired, no error exists in their relative positioning. Some error would, of course, be present in practice and this would be deduced by the observed shift of one trace relatively to the other. It goes without saying that the mechanism for displacing the workpiece calls for great mechanical precision in its execution.

The invention will now be described by way of example only with reference to the accompanying diagrammatic drawing wherein.

Figure 1:
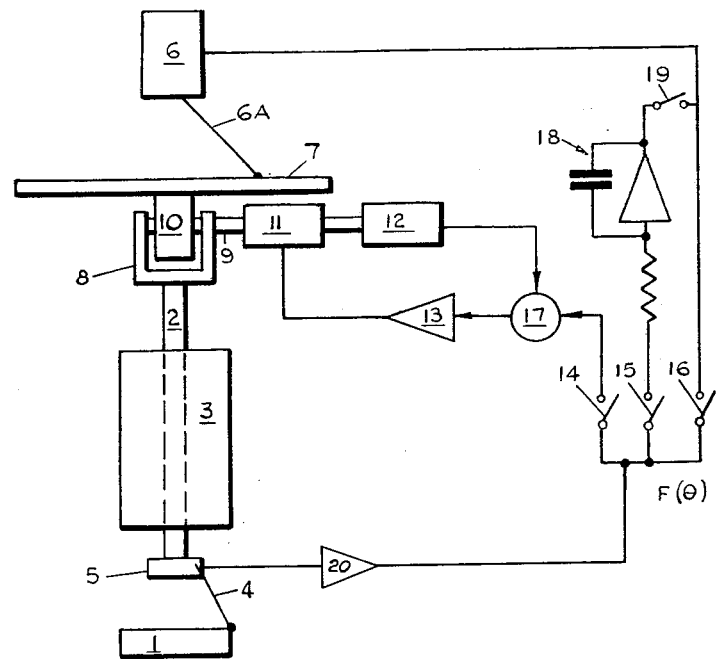
FIG. 1 illustrates one embodiment of the invention.

With reference to FIG. 1, a workpiece 1 having a nominally round contour to be tested is positioned upon a work-table (not shown) in approximately concentric relationship with a spindle 2 rotatable in quill 3, said spindle carrying a pivotally mounted sensing arm 4 bearing with slight pressure upon said contour. The sensing arm transmits any motion imparted thereto by eventual contour irregularities to transducer means 5, which causes the generation of an electrical signal proportional to the displacement of the arm around its pivot.

The arrangement so far described is similar to the layout disclosed in British patent specification No. 706,763, wherein the output fom the transducer is amplified and fed to a stationary pen recorder cooperating with a chart rotating synchronously with the spindle carrying the sensing arm.

With continued reference to FIG. 1, a recorder 6 having recording pen 6a is rotatable synchronously with the spindle 2, while chart table 7 is only intended to be displaceable within limits, in the X and Y plane, in a manner which we shall presently see.

The spindle 2 carries a yoke 8 in which is rotatably mounted a shaft 9 integral in rotation with integrating wheel 10, servo-motor 11, and tachometer 12, the yoke and the associated parts being in turn integral in rotation with spindle 2.

Servo-motor 11 and tachometer 12 are included in a conventional servo-loop together with servo amplifier 13.

Switches 14, 15 and 16 enable the $F(\theta)$ signal issuing from the transducer means and suitably amplified through amplifier 20 to be extended respectively to the feed-back point 17 of said servo-loop, to integrating and storing amplifier 18 and to the recorder 6.

Since the system is intended, in the first instance, to produce a contour trace which is concentric with the centre of the chart upon table 7 regardless of any residual eccentricity between workpiece and spindle, the first operation is directed to the automatic setting up of table 7. To this end, the tip of arm 4 is allowed to feel the contour of workpiece 1 for one complete revolution of spindle 2 after closing switch 14.

As the revolution progresses, the $F(\theta)$ signal admitted to feed-back point 17 through switch 14 is operative, through amplifier 13, in causing motor 11 to turn in one or other direction according to whether the signal at any given instant is positive or negative going. The feedback from tachometer 12 ensures stability in a known manner.

When motor 11 rotates, it turns shaft 9 and, consequently, integrating wheel 10, which frictionally engages chart table 7. Rotation of wheel 10 displaces chart table 7 in the X—Y plane thereof in a direction which at any given instant is governed by the angle through which its axis of rotation has swung in the plane of the chart table, motor 11 and tachometer 12 rotating with spindle 2 as indicated earlier on (amplifier 13 need not rotate, connections thereto being made for example through slip rings around spindle 2).

For a clearer understanding of the operation, let us assume, in the first instance, that no eccentricity exists between workpiece 1 and spindle 2. In these circumstances, the $F(\theta)$ signal contains only the true contour signal component of workpiece 1. Amplifier 13 causes motor 11 to rotate in one or other direction and to an extent governed by $F(\theta)$. The integrating wheel 10 displaces table 7 as the axis of rotation of the wheel swings in the plane of the table from 0 to $2\pi$. If the centre of the chart upon the table was concentric with the spindle and consequently the axis of rotation of the recorder at angle 0, the table will return to this position whatever the successive displacements thereof in response to the signal. This may be readily appreciated by reflecting upon the fact that the beginning and the end of a continuous contour must coincide.

If, on the other hand, a residual eccentricity error does exist between workpiece 1 and spindle 2, the $F(\theta)$ signal will have a fundamental component representative of said eccentricity. This means that the integrating wheel will respond to a combined signal consisting of the true contour signal, which has no effect on the final positioning of the chart table, and the eccentricity error component. This component is arranged to cause the wheel 10 to turn in such a way as to displace the table in a direction which at any angle as defined above between the values 0 to $2\pi$ the centre of the chart is brought nearer to the tip of the recorded pen as the workpiece contour tends to swing arm 4 outwards as a result of eccentricity and vice versa. This means that after spindle 2 has completed one revolution the table will be located at a position which, if maintained, enables, in a subsequent revolution of spindle 2, the contour to be traced correctly centred around the centre of the chart, since the integrating wheel has, in fact, introduced a displacement between the centre of the chart and the axis of rotation of spindle 2 which is exactly correct for counteracting the effect of eccentricity in swinging the recorder pen towards and away from said axis.

Mathematically the action of the integrating wheel is equivalent to evaluating the integral $$\frac{1}{\pi}\int_0^{2\pi} F(\theta)e^{j\theta}d\theta$$

(where $\theta$ is the angular rotation of spindle 2 and $F(\theta)$ is, of course, the signal).

Having set up the table in the first revolution of the spindle, switch 14 is opened, switches 15 and 16 are closed, and spindle 2 is rotated for a further revolution during which the recorder, fed through switch 16, will leave a continuous true contour trace concentric with the centre of the chart.

Closure of switch 15 during this second revolution has enabled the $F(\theta)$ signal to be integrated by integrating and storing amplifier 18, which at the end of the revolution has stored therein the mean value of the signal.

Having traced the contour signal and stored the mean value thereof at the end of the second revolution of spindle 2, table 7 is allowed to fall back into concentricity with spindle 2 for instance through a spring and detent arrangement (not shown) switches 15 and 16 are opened and switch 19 is closed (switch 14 is kept open). The recorded is now fed from the integrator, which means that the pen thereof will assume a position corresponding to the mean of the signal trace. The spindle is now allowed to go through a third revolution during which the pen will produce a mean trace or circle superposed upon the true contour trace.

The integrator is conveniently arranged to produce an output which is correctly scaled with respect to the contour trace.

The result of the entire operation is that a contour trace and superposed mean circle are produced concentrically with the centre of the chart despite the residual eccentricity between workpiece and spindle.

It will be appreciated that the sequence indicated above of positioning the table, tracing and integrating the signal, and tracing the mean circle, may be altered. Integration may, for instance, be performed in the first revolution simultaneously with the positioning of the table, the object contour and the mean circle being traced in the second and third revolutions, respectively, as before. The switching sequence would naturally be adjusted to correspond.

A further embodiment will now be described with reference to FIG. 2 wherein parts 1 to 6 inclusive are as described with reference to FIG. 1.

Figure 2:
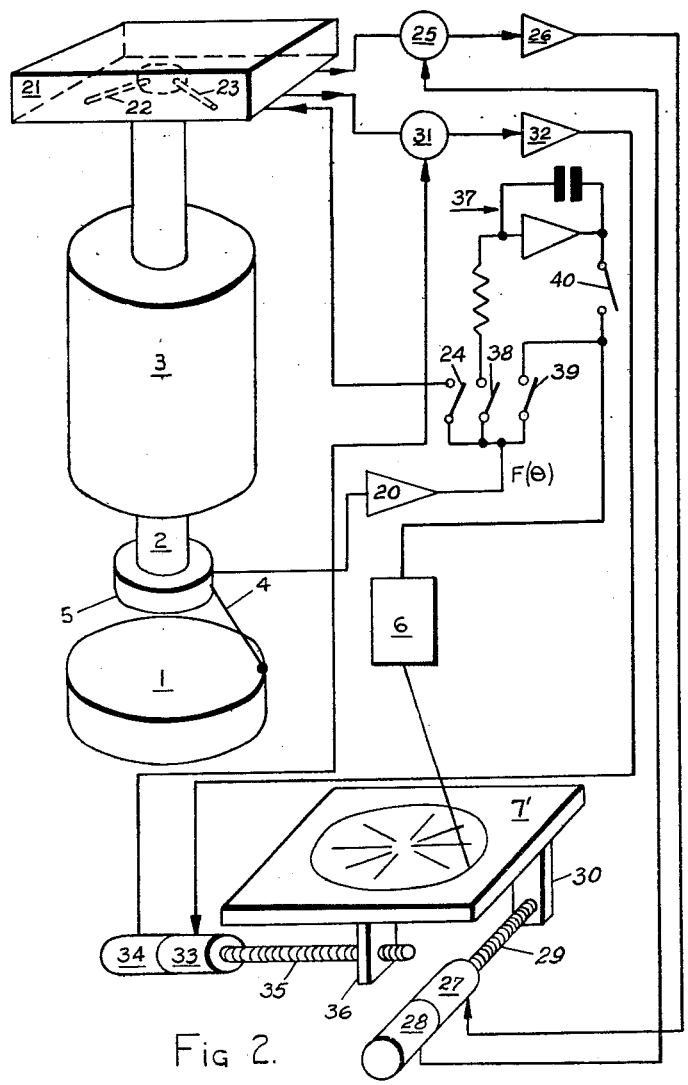
FIG. 2 illustrates another embodiment of the invention.

In FIG. 2, a sine cosine potentiometer 21 is mounted for rotation of sine slider 22 and cosine slider 23 integrally with spindle 2. The stator of potentiometer 21 receives a signal input through switch 24. The output from the sine slider 22 is extended to feed-back point 25 of a servo-loop including servo amplifier 26, motor 27, tachometer 28, said loop governing the rotation of a screw 29 engaging nut 30 through which table 7' may be moved along the Y ordinate. Similarly, the output of the cosine slider 23 is extended to feed-back point 31 of a servo-loop including amplifier 32, motor 33, and tachometer 34 governing the rotation of screw 35 engaging nut 36 through which table 7' may be moved along the X ordinate.

The $F(\theta)$ signal may be routed to storing integrator 37 through switch 38 or to recorder 6 through switch 39. Switch 40 enables the value stored in integrator 37 to be extended to recorder 6.

In operation, spindle 2 is rotated one complete revolution while switch 24 is closed, the remainder of the switches being left open. The $F(\theta)$ signal through the sine cosine potentiometer 21 causes the two servo-loop to operate and continuously adjust the X–Y positioning of the table 7' until, upon completion of one revolution, the table is finally positioned for counteracting the effect of any eccentricity between workpiece 1 and spindle 2, as before. In a further complete revolution of spindle 2, switch 24 is opened, switches 38 and 39 are closed. Now the $F(\theta)$ signal is fed to the recorder 6, which traces the error upon a chart laid on table 7', and is fed to storing integrator 37 wherein its mean value is accumulated and held. At the end of the second revolution when the error trace is complete, table 7' is allowed to fall back into concentricity with the axis of the recorder, switches 24, 38 and 39 are opened and switch 40 is closed. Now the recorder responds only to the mean value of the signal and traces the mean circle as in the previous embodiment.

Again, integration may be performed in the first revolution together with the setting up of the table rather than in the second revolution.

It will be appreciated that in the second embodiment hereinbefore described with reference to FIG. 2 the displacement of table 7' in the X–Y plane is in effect the mechanical evaluation of the integral $$\frac{1}{\pi}\int_0^{2\pi} F(\theta)e^{j\theta}d\theta$$

In either of the embodiments hereinbefore described, a further mode of operation is possible where it is not essential to draw the contour trace concentrically with the centre of the chart but it is sufficient to draw a mean trace superposed upon the contour trace. In such case, the contour trace is drawn in the first revolution of the spindle with centre of table 7 in concentric relationship with spindle 2 (FIG. 1) and centre of table 7' in concentric relationship with axis of rotation of recorder 6 (FIG. 2). This means that the contour trace will be drawn eccentric to the centre of the chart to an extent governed by the eccentricity between workpiece and spindle. In the second revolution the table is shifted to offset the effect of eccentricity and allow a mean trace to be drawn concentric with the contour trace.

What is claimed is:

1. A system for testing the contour of an object which comprises sensing means arranged in approximately concentric and relative rotational relationship with the object and in contact with the periphery of the object for feeling its contour, means deriving from said sensing means a total electrical signal which is representative of the distance of each point on the periphery from a datum which is constant for the entire periphery of the object, said signal including a true contour component and an error component proportional to such mounting eccentricity as may be incurred in establishing the said rotational relationship as between object and sensing means, recorder means comprising chart and signal responsive recorder elements mountable for relative rotation about a recorder axis, means including motor means responsive to said signal for effecting a preliminary relative adjustment as between the center of said chart and said recorder axis in response to said error component in said signal to compensate for said mounting eccentricity, and means for then applying said signal to said recorder element of said recorder means for recording on said chart only the true contour component of said signal concentric with the center of said chart.

2. A contour testing system as defined in claim 1 and which further includes means for integrating and storing the mean value of said signal, and means thereafter for also recording on said chart the mean value of said signal and with the chart center aligned with said recorder axis.

3. A system for testing the contour of an object which comprises sensing means arranged in approximately concentric and relative rotational relationship with the object and in contact with the periphery of the object for feeling its contour, means deriving from said sensing means a total electrical signal which is representative of the distance of each point on the periphery from a datum which is constant for the entire periphery of the object, said signal including a true contour component and an error component proportional to such mounting eccentricity as may be incurred in establishing the said rotational relationship as between object and sensing means, recorder means comprising a table mounted chart and a signal responsive recorder element therefore, said table and recorder element forming a pair as to which one member thereof is rotatable relative to the other about a recorder axis and in synchronism with said rotational relationship between object and sensing means, means including motor means responsive to said signal for effecting a preliminary relative adjustment as between the center of said chart and said recorder axis in response to the error component in said signal to compensate for mounting eccentricity, and means then applying said signal to said recorder element of said recorder means for recording on said chart only the true contour component of said signal concentric with the center of said chart.

4. A system for testing the contour of an object as defined in claim 3 wherein said motor means is constituted by a servo motor element of a servo loop which also includes an amplifier fed by said signal, said servo motor driving an integrating wheel which affects said relative adjustment as between the chart center and recorder axis, and the rotational axis of said integrating wheel being also revolved about an axis normal thereto in synchronism with said relative rotation as between object and sensing means.

5. A system for testing the contour of an object as defined in claim 4 wherein said integrating wheel engages said table at a location corresponding to said recorder axis.

6. A system for testing the contour of an object as defined in claim 13 wherein said means responsive to said signal for effecting a preliminary relative adjustment as between the center of said chart and said recorder axis in response to said error component in said signal to compensate for said mounting eccentricity comprises a sine-cosine resolver fed by said signal and mounted for rotation in synchronism with said relative rotation as between the object and said sensing means and producing a sine output and a cosine output, and said motor means is constituted by first and second motors responsive respectively to said sine and cosine outputs.

7. A system for testing the contour of an object as defined in claim 6 wherein said chart table is mounted for displacements in mutually perpendicular directions, and said first and second motors are utilized respectively for effecting said table displacements.

8. A system for testing the contour of an object which comprises sensing means arranged in approximately concentric and relative rotational relationship with the object and in contact with the periphery of the object for feeling its contour, means deriving from said sensing means a total electrical signal which is representative of the distance of each point on the periphery from a datum which is contant for the entire periphery of the object, said signal including a true contour component and an error component proportional to such mounting eccentricity as may be incurred in establishing the said rotational relationship as between object and sensing means, recorder means comprising chart and signal responsive recorder elements mountable for relative rotation about a recorder axis, means applying said signal to said recorder element of said recorder means for recording on said chart a trace of the contour of the object, said contour trace being located eccentric to the chart center by an amount representative of said mounting eccentricity, means for integrating and storing the mean value of said signal, means including motor means responsive to said signal for effecting a relative adjustment as between the center of said chart and said recorder axis in response to the error component in said signal to compensate for said mounting eccentricity, and means for then recording on said chart a trace of the mean value of said signal concentric with said contour trace.

References Cited by the Examiner
UNITED STATES PATENTS
2,723,461  11/55  Reason et al. _____ 33—174

ISSAC LISANN, *Primary Examiner.*
L. R. PRINCE, *Examiner.*

UNITED STATES PATENT OFFICE
CERTIFICATE OF CORRECTION

Patent No. 3,160,958 December 15, 1964

Keith Gordon Huntley

It is hereby certified that error appears in the above numbered patent requiring correction and that the said Letters Patent should read as corrected below.

Column 6, line 46, for "therefore" read -- therefor --; line 63, for "affects" read -- effects --; same column 6, line 74, for the claim reference numeral "13" read -- 3 --.

Signed and sealed this 20th day of April 1965.

(SEAL)
Attest:

ERNEST W. SWIDER
Attesting Officer

EDWARD J. BRENNER
Commissioner of Patents